US009962603B2

(12) United States Patent
Mikaelian et al.

(10) Patent No.: US 9,962,603 B2
(45) Date of Patent: May 8, 2018

(54) BOARD GAME WITH STACKABLE TOKENS

(71) Applicants: Michael G. Mikaelian, Brunswick, OH (US); Daniel Alexander Mikaelian, Brunswick, OH (US); Victoria Anna Ayvazyan, Brunswick, OH (US); Armen Samuel Mikaelian, Brunswick, OH (US); Andreas Robert Mikaelian, Brunswick, OH (US)

(72) Inventors: Michael G. Mikaelian, Brunswick, OH (US); Daniel Alexander Mikaelian, Brunswick, OH (US); Victoria Anna Ayvazyan, Brunswick, OH (US); Armen Samuel Mikaelian, Brunswick, OH (US); Andreas Robert Mikaelian, Brunswick, OH (US)

( * ) Notice: Subject to any disclaimer, the term of this patent is extended or adjusted under 35 U.S.C. 154(b) by 207 days.

(21) Appl. No.: 14/970,973

(22) Filed: Dec. 16, 2015

(65) Prior Publication Data

US 2017/0173450 A1 Jun. 22, 2017

(51) Int. Cl.
| A63F 3/00 | (2006.01) |
| A63F 13/92 | (2014.01) |
| A63F 9/04 | (2006.01) |
| A63F 9/24 | (2006.01) |

(52) U.S. Cl.
CPC ...... *A63F 3/00006* (2013.01); *A63F 3/00643* (2013.01); *A63F 3/00697* (2013.01); *A63F 13/92* (2014.09); *A63F 9/04* (2013.01); *A63F 2003/00018* (2013.01); *A63F 2003/00716* (2013.01); *A63F 2009/2457* (2013.01); *A63F 2009/2485* (2013.01)

(58) Field of Classification Search
USPC .......................................... 463/31; 273/146
See application file for complete search history.

(56) References Cited

U.S. PATENT DOCUMENTS

| 1,903,661 A | 4/1933 | Storey |
| 3,582,080 A | 6/1971 | Schick |
| 4,852,886 A | 8/1989 | Zaruba et al. |

(Continued)

FOREIGN PATENT DOCUMENTS

| AU | 647726 | 3/1994 |
| DE | 2020006014253 | 2/2007 |

(Continued)

OTHER PUBLICATIONS

International Search Report and Written Opinion dated Feb. 27, 2017; Application PCT/US16/64531; 7 pages.

(Continued)

*Primary Examiner* — Pierre E Elisca
(74) *Attorney, Agent, or Firm* — Mark E. Bandy; Rankin, Hill & Clark LLP (57) ABSTRACT

Multi-player board games are described that include a playing board that comprises a collection of playing spaces and home spaces, groups of stackable tokens, and playing dice. Also described are methods of playing the games in which players roll the dice to determine how many spaces they may move their respective token(s). Players strategically stack or split their tokens and try to return to their home space in order to collect tokens from other players. The winner is determined by which player has the greatest number of tokens.

15 Claims, 5 Drawing Sheets

(56) References Cited

U.S. PATENT DOCUMENTS

| | | |
|---|---|---|
| 4,936,588 A | 6/1990 | Rader et al. |
| 5,318,305 A | 6/1994 | Lococo |
| 5,772,207 A | 6/1998 | Caseila |
| 6,189,887 B1 | 2/2001 | Dommasch |
| 6,883,803 B1 | 4/2005 | Barry |
| 7,255,348 B1 | 8/2007 | Shaffer |
| 8,328,196 B1 | 12/2012 | Kihslinger et al. |
| 8,398,081 B1 | 3/2013 | Girolmo et al. |
| 2010/0090401 A1* | 4/2010 | Jacklin ............ A63F 3/00006 273/237 |
| 2011/0018199 A1* | 1/2011 | Peterson ............ A63F 3/00072 273/256 |
| 2011/0198806 A1* | 8/2011 | Wiseman ............ A63F 3/02 273/260 |
| 2013/0161908 A1* | 6/2013 | Grossman ............ A63F 3/00 273/249 |
| 2014/0094256 A1* | 4/2014 | Hilbert ............ G07F 17/3211 463/20 |
| 2014/0274344 A1* | 9/2014 | Kelly ............ G07F 17/32 463/25 |

FOREIGN PATENT DOCUMENTS

| | | |
|---|---|---|
| DE | 202013008042 | 11/2013 |
| WO | 2006097731 | 9/2006 |

OTHER PUBLICATIONS

"Focus (Domination) rules of the game"; 2 pages.
"The Opinionated Garners"; https://opinionatedgamers.com/2015/05/19/sdj-re-reviews-3-focus-a-k-a-domination/le_game; 7 pages.
"Mensch ärgere dich nicht—German board game"; Josef Friedrich Schmidt; 1907/1908: Game description; 2 pages.

* cited by examiner

BOARD GAME WITH STACKABLE TOKENS

FIELD

The present subject matter relates to board games using stackable tokens. The games are played by multiple people and involve strategy in deciding how to move, assemble, and/or split groups of tokens in efforts to capture other players' tokens.

BACKGROUND

A wide array of board games are known in the art. Many games require the use of numerous and different game pieces. Even if one game piece is lost or broken, playability of the game is often significantly compromised.

Games that are based at least in part upon a player's strategy are favoured by many people rather than games based solely upon chance. However, many strategy-based games are relatively complicated, involve tedious procedures for game play, or require an assortment of game pieces. These factors and others can lead to a game that is not particularly well suited for children or certain adults.

Accordingly, a need exists for a strategy-based game which involves relatively few game pieces yet which involves considerable strategy and decision making in its play.

SUMMARY

The difficulties and drawbacks associated with previously known games are addressed in the present method and apparatus for a multi-player game.

In one aspect, the present subject matter provides a board game comprising a playing board defining a plurality of playing spaces arranged one after another in a continuous path and including a plurality of home playing spaces each separated from neighboring home playing spaces by an equal number of playing spaces. The board game also comprises a plurality of stackable tokens for movement along the playing spaces. And, the board game comprises a pair of playing dice for indicating movement of the token(s) of a player upon rolling of the dice. Each die has all its faces marked with different numerical values. The tokens of each player are moved along the continuous path according to the numerical values on the pair of rolled dice. The tokens are moved by their respective players from a respective home playing space, along the continuous path, and returning or passing the respective home playing space to thereby collect tokens from other players. The game is concluded when only one active player remains. At the conclusion of the game, the winner of the game is determined by the player who collected and finished with the greatest number of tokens.

In another aspect, the present subject matter also provides a method of playing a board game comprising providing (i) a playing board defining a plurality of playing spaces arranged one after another in a continuous path and including a plurality of home playing spaces each separated from neighboring home playing spaces by an equal number of playing spaces, (ii) a plurality of stackable tokens for movement along the playing spaces, and (iii) a pair of playing dice for indicating movement of the tokens of a player, each die having all its faces marked with different numerical values. The method also comprises rolling the pair of playing dice to indicate movement of tokens of a respective player. The method additionally comprises moving at least one token along the continuous path, the number of playing spaces corresponding to numerical values in the pair of rolled dice. Upon a respective player reaching their home playing space, that player collects tokens from other players. The game is concluded when only one active player remains. At the conclusion of the game, the winner of the game is determined by the player who collected and finished with the greatest number of tokens.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

The present subject matter relates to games which combine elements of strategy, skill, and chance. The games may include one or more physical components or be in electronic virtual form. The present subject matter also relates to methods of playing the games.

The games generally comprise a playing board or other surface that defines a plurality of playing spaces. The plurality of playing spaces are arranged one after another in a continuous loop or other closed pattern. In many embodiments, the continuous loop is in a square shape. However, the present subject matter includes a wide array of other shapes and arrangements for the continuous and closed loop of playing spaces. In a particular version, the board is a relatively flat board defining an upwardly directed face having the plurality of playing spaces extending along the perimeter of the board.

The plurality of playing spaces includes a collection of home playing spaces. The home playing spaces, or periodically referred to herein as "home spaces," are separated from one another by an equal number of playing spaces. For versions of the board in which the continuous loop is square shaped, each of the home spaces is located at or proximate a corner of the square shaped continuous loop. Moreover, for square shaped loops, in many versions of the present subject matter, each side of the square shaped loop includes 8 playing spaces. In other embodiments, each side includes 9 playing spaces. And, in other embodiments, each side includes 10 playing spaces. However, it will be understood that the present subject matter includes continuous loops having a number of playing spaces along a side or region different than these representative examples. The number of home spaces may vary, however a number of home spaces within a range of from 3 to 8 is useful, with 4 being typical.

However, it will be understood that the present subject matter includes the use of numbers of home spaces outside of this range.

The game also comprises a plurality of stackable tokens for movement along the playing spaces. The tokens may be in a wide array of different forms. However, in many embodiments, the tokens are stackable upon one another. The term "stackable" as used herein refers to the configuration of the tokens being such that tokens can be positioned one upon another or a group of tokens. The tokens after stacking, retain their stacked orientation as they are moved around the playing board. The tokens after stacking, can also be easily destacked or "split" into two or more units of tokens or groups of tokens. Although the tokens are typically stacked in a vertical direction, the present subject matter includes tokens and collections of tokens which are stacked, organized, or otherwise grouped in non-vertical orientations. In many embodiments of the present subject matter, the tokens are also provided in one or more colors. Typically, a group of tokens having a common color or the same color is provided for each player. As the game of the present subject matter can be played by nearly any number of players such as from 2 to about 10 or more, a corresponding number of differing colors of tokens can be utilized.

The game also comprises one or more die or dice for indicating movement of the token(s) of a player upon rolling of the die or dice. Each die typically has all of its faces marked with different numerical values. In many embodiments of the present subject matter, the game comprises a pair of dice, in which each die is cube shaped and defines a total of six faces, each face marked with a different numerical value. However, it will be appreciated that the present subject matter includes the use of other die or dice which define a different number of faces.

The game although referred to herein as a "board game" and described in terms of physical components, can also be in digital, electronic, or virtual form. The various components of the game can be in digital, electronic, or virtual form and produced and/or "played" using software algorithms and computing hardware. For example, a game board and various tokens which are moved along the board can be provided in electronic virtual form and exist as images appearing on a monitor or display screen. These aspects are described in greater detail herein.

The game is played by rolling the dice to generate one or more numerical values to be indicated on face(s) of the dice. The numerical values as previously noted, designate the number of playing spaces a player moves his/her token(s). As will be understood, typically after rolling of the dice, the upwardly directed faces of the dice are the faces designated for indicating the numerical values.

The tokens are then moved by their respective players from a respective playing (or home) space, along the continuous path. As described in greater detail herein, the players each take turns and attempt to move their tokens around the continuous path and return to or pass their respective home space. Upon reaching their home space, a player collects tokens from other players. Details of these and other aspects are provided herein, Movement of the tokens may occur in a clockwise direction around the loop, or in a counterclockwise direction around the loop.

Figure 1:
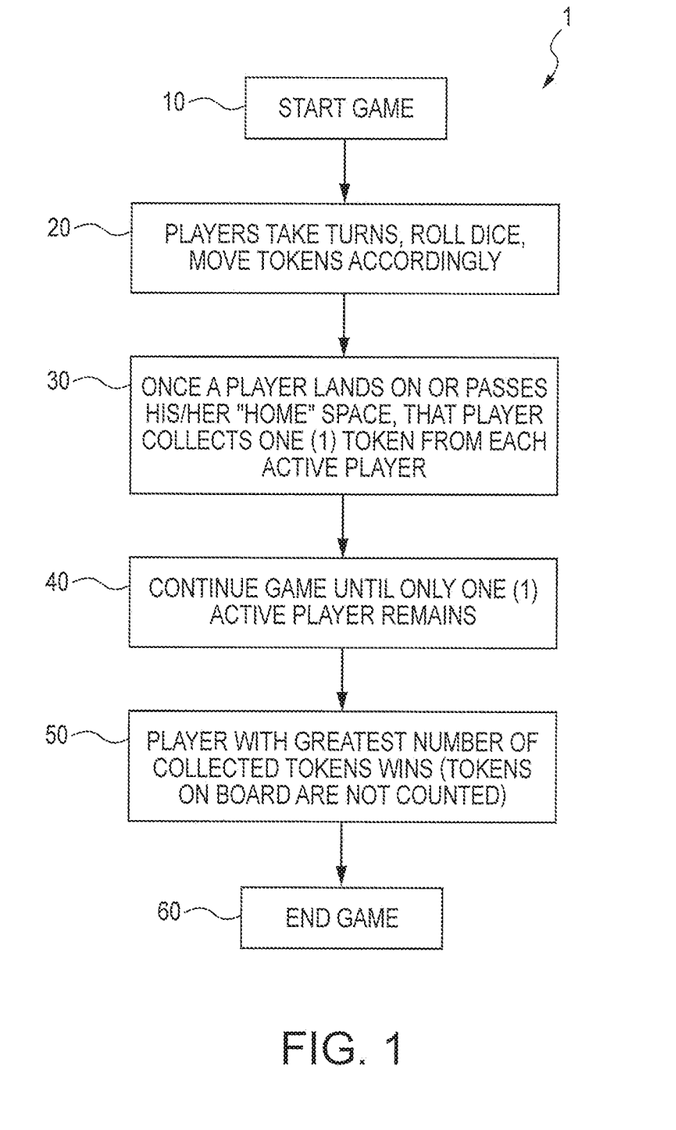
FIG. 1 is a schematic flow chart illustrating a method of playing an embodiment of a game in accordance with the present subject matter.

FIG. 1 illustrates a method 1 for playing an embodiment of the present subject matter game. The method 1 generally includes starting the game shown at item 10, and then at 20, the players moving their respective tokens around the game board along the loop. As described in greater detail herein, the movement of token(s) is determined by rolling the dice. The players take turns rolling the dice and moving their respective tokens along the loop. Details as to how token(s) may be moved are described in greater detail herein. As denoted at 30, after progressing around the loop, once a player lands on or passes his/her home space, that player collects one (1) token from each active player. As shown at 40, this process is repeated until only a single active player remains. Referring to item 50, the player with the greatest number of collected and finished tokens wins, excluding tokens on the board. There are three ways a player can contribute tokens for his collection. One way is that a player may finish his/her own tokens. A second way is that a player may finish inactive tokens captured in the path. As noted above, after capturing opponents' token(s), captured token(s) become inactive and carried forward attached under a player's active token. Upon reaching the home/finish space, active tokens along with inactive tokens are contributed to the player's collection, A third way is that, upon finishing each active token, a player collects one token from each active player. Players who pay tokens to a finishing player can choose which token to give from their possession. Tokens that are given can be an active token, a captured inactive token, or a finished token. The game is concluded at 60.

Figure 2:
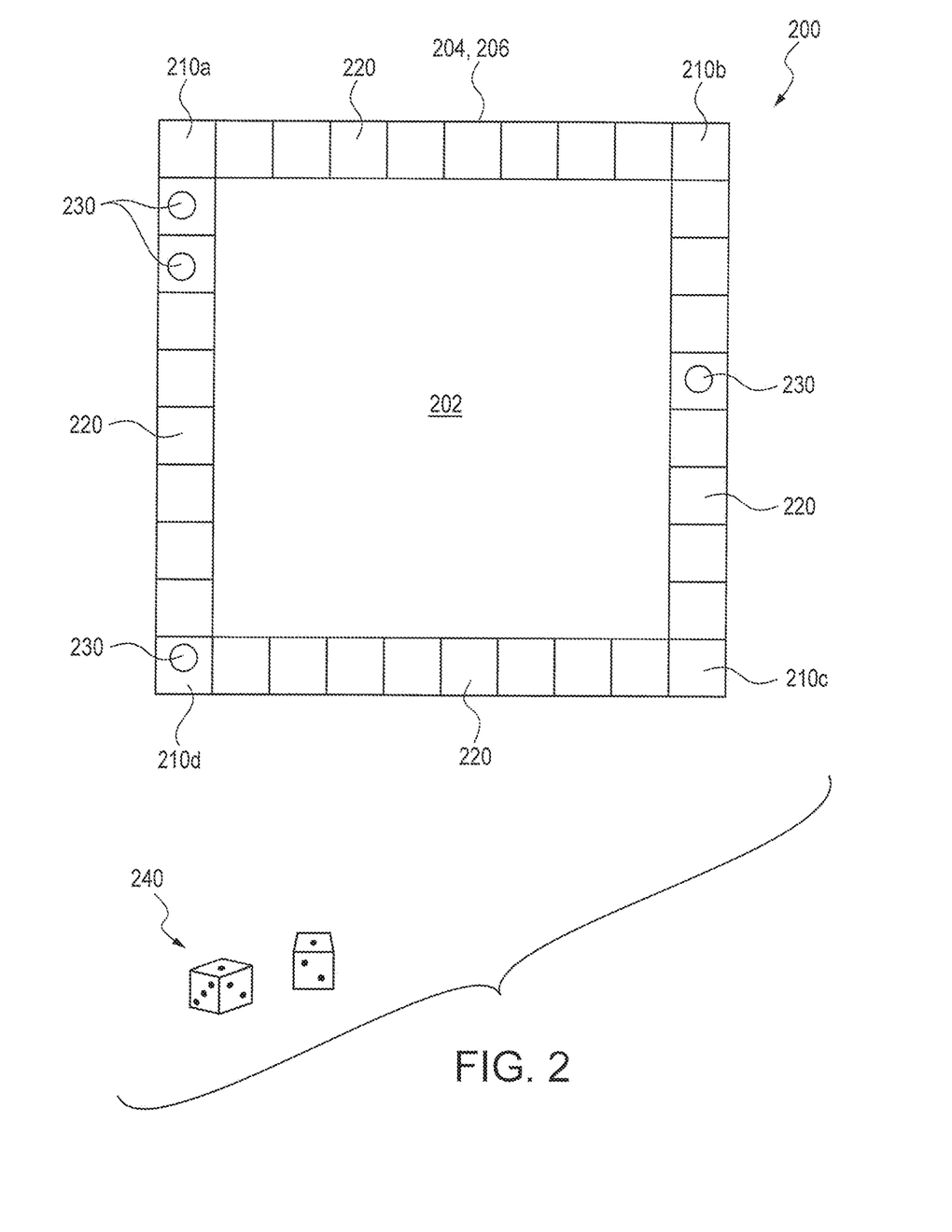
FIG. 2 is a schematic illustration showing components of an embodiment of a game in accordance with the present subject matter.

FIG. 2 shows the game 200 comprising a board 202 or other playing surface that defines a continuous loop 204 of playing spaces. The loop 204 is depicted in FIG. 2 as a square shaped loop having four home spaces 210a, 210b, 210c, and 210d. In this particular embodiment of the game, neighboring home spaces are separated by a total of eight (8) playing spaces 220. For example, home spaces 210a and 210b are neighboring one another, and they are separated by a total of eight (8) playing spaces 220. The continuous loop 204 extends along a perimeter 206 of the board 202, In the particular embodiment shown in FIG. 2, each of the home spaces 210 is located at a respective corner of the board 202. The game 200 also comprises a plurality of tokens 230 for movement around the spaces 210, 220 of the loop 204. Movement of the tokens is determined by rolling the dice 240. In the particular embodiment shown, two dice are used.

Figure 3A:
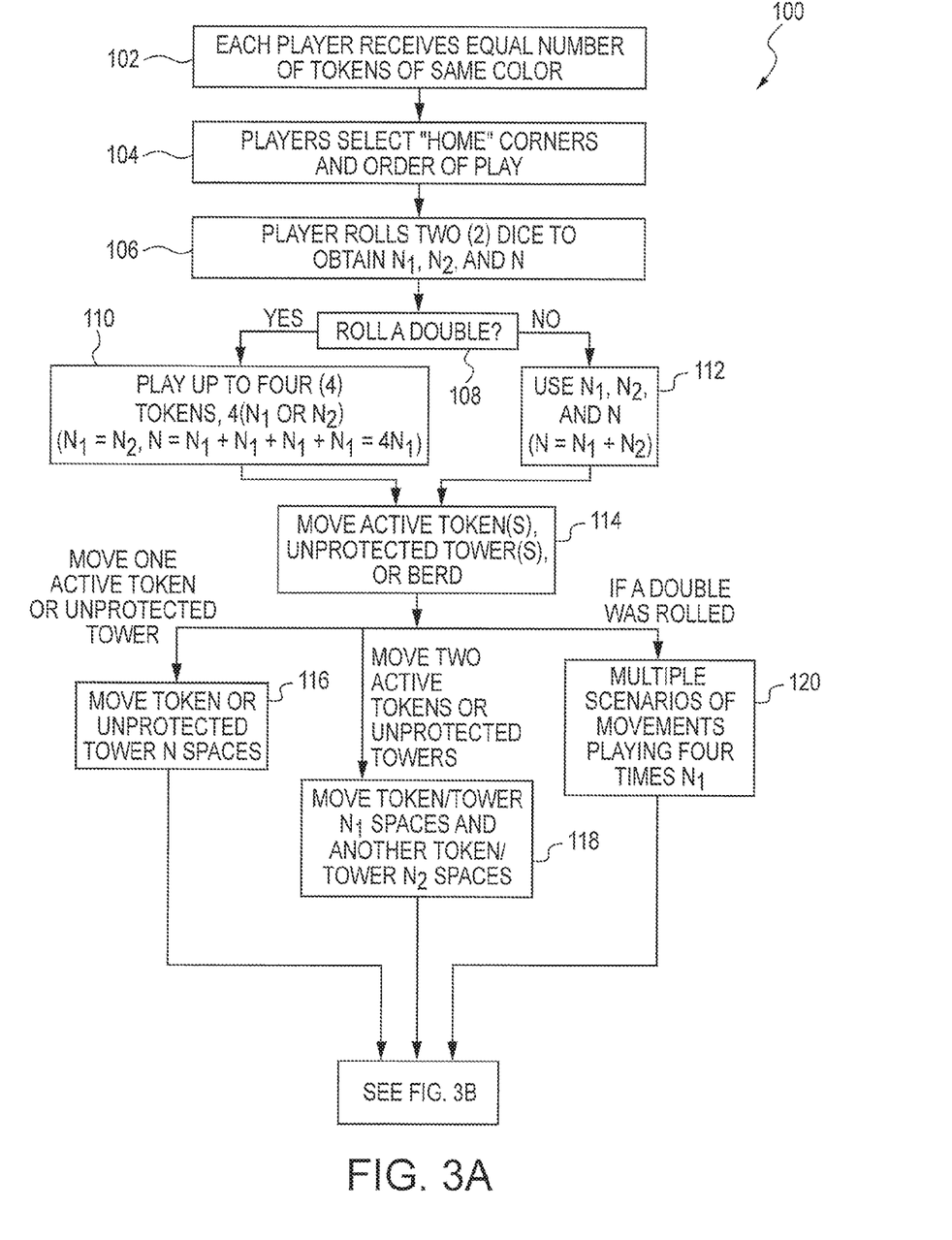
FIGS. 3A and 3B are schematic flow charts illustrating additional details of a method of playing an embodiment of a game in accordance with the present subject matter.
Figure 3B:
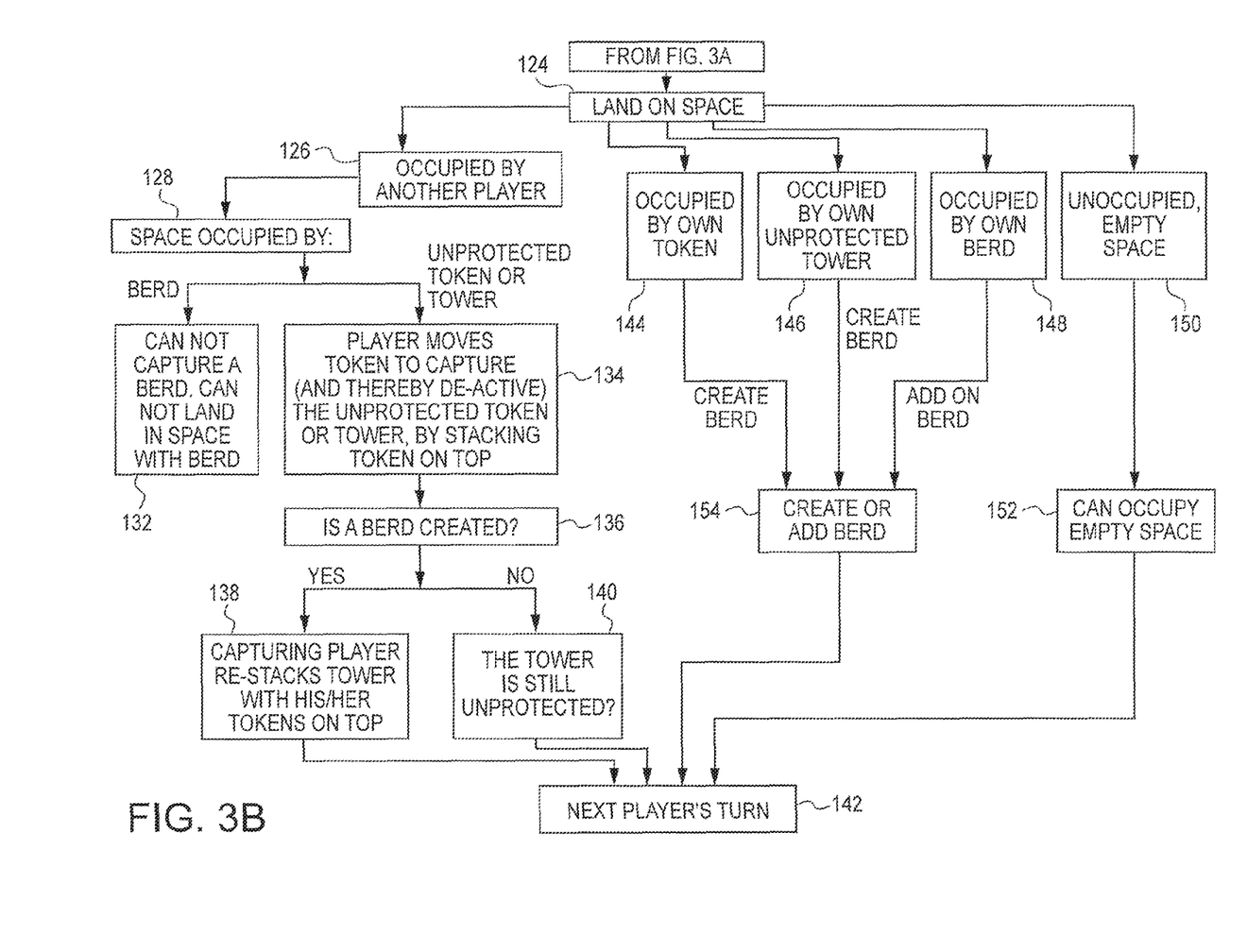

FIGS. 3A and 3B are schematic flow charts illustrating additional details of a method 100 of playing an embodiment of a game in accordance with the present subject matter. At the beginning of the game, each player will receive an equal number of tokens of same color as shown at 102. Each player chooses the home space or corner from where he/she will start and then places their stacked tokens on that corner as shown at 104. The starting corner or home space will also be the ending corner for a player. In order to determine which player goes first, one technique is as follows. Players roll one die to identify who will go first. The highest scored player will start first and other players will follow in a clockwise direction. The highest scored player also has the right to choose his/her starting corner. The second highest scored player will choose his/her corner, and so on. The player who rolled the highest number gets to go first and every player takes their turn in sequential order thereafter. Players can choose any corner or home space including those that have been already taken. For example, if multiple players choose to start from the same home space, the stacked tokens each stack differing in color, will be placed in the same corner.

Figure 4:
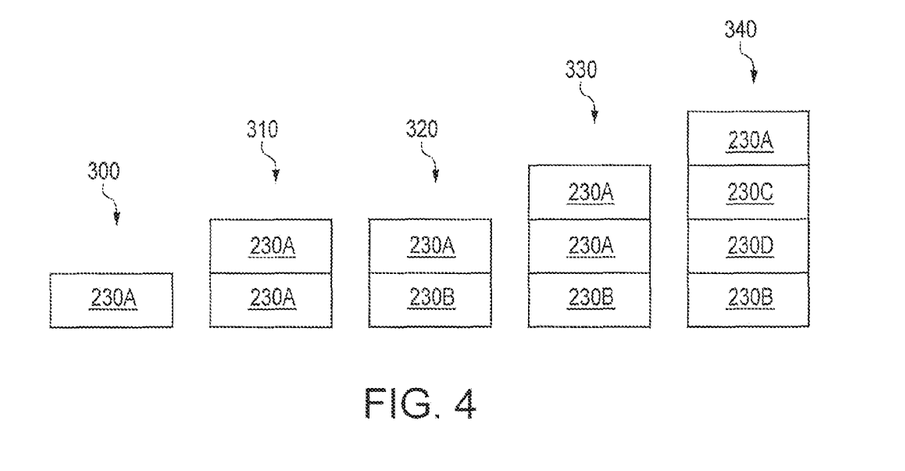
FIG. 4 is a schematic illustration showing various combinations of stacked tokens in an embodiment of a game in accordance with the present subject matter.

In describing the present subject matter games, it is convenient to employ several definitions. FIG. 4 schematically depicts various arrangements of token(s) 230. A "tower" is a stack of two or more tokens (any color). Referring to FIG. 4, towers are shown as 310, 320, 330, and 340 each of which include multiple tokens 230, the letter suffix, i.e., A-D, indicates the player owning that particular token. A single token 230A is shown as 300, which for the description herein, is not a tower. The color of the token on top represents who owns that tower. In FIG. 4, each of the towers 310, 320, 330, and 340 is owned by player A because player A's token 230A is positioned on the top of each tower. An unprotected tower (see definition below) moves like a single token. In FIG. 4, towers 320 and 340 are unprotected. The single token 230A shown as item 300 is also unprotected. A "Berd" is two or more tokens of the same color stacked directly on each other on the top of a tower. A Berd is considered a protected tower. A Berd is not a permanent structure. Instead, a Berd is built for temporary protection and blocking opponents moving toward the finish. In FIG. 4, towers 310 and 330 are protected Berd towers because each contains two or more tokens of player A, i.e., tokens 230A, stacked directly upon each other and positioned at the top of the tower. An "unprotected tower" or "unprotected token" is any token or tower which is not a "Berd". A "double" refers to a particular combination of two identical numerical values rolled by the dice. An "active token" is a token still on the board that has not been captured. Referring to FIG. 4, all tokens of player A, i.e., tokens 230A, are active. Tokens of players B, C, and D, i.e., tokens 230B, 230C, and 230D respectively, are all inactive because they have been captured by player A. An "active player" is a player who still has active tokens.

Various rules exist for moving tokens. Referring to FIG. 3A and beginning at 106, players roll the dice and move tokens on the board by counting playing spaces in a clockwise direction, for example. A player can play with one token that is moved a number of playing spaces equal to the sum of both numerical values of the dice, N. Alternatively, a player can move one token or unprotected tower a number of playing spaces equal to the numerical value of one die, $N_1$, and another token or unprotected tower a number of playing spaces equal to the numerical value of the other die, $N_2$. Players can capture an opponent's token or unprotected tower when they land in the same playing space occupied by that token or tower. However, a player can not capture a Berd and a player can not land in a playing space that contains another player's Berd. On the other hand, a player can create a Berd when landing his/her token on the space occupied by that player's own token or unprotected tower. If a player captures an opponent's unprotected tower that contains that player's color token within the tower, then the player restacks the entire tower and positions his/her tokens on the top of the restacked tower, thereby creating a Berd. When the player captures an unprotected token, then that player can move his/her new tower with the captured tokens positioned at the bottom of the tower. There is no limit with regard to capturing other tokens. Basically, a player creates an unprotected tower that moves like a single token. However, if a player creates a Berd, the player can not move the Berd as a whole because it contains two or more active tokens and each token must be moved separately. In order to move token(s) or unprotected towers) from the Berd the player can detach them from the Berd and play separately, Consequently, the original Berd will be reduced to a smaller Berd or unprotected tower or to a single active token.

Referring to 108 and 110, if a double is rolled, particular rules exist for moving that player's token(s) and/or towers. Example of doubles include the following combinations of numerical values indicated by the pair of rolled dice: 1&1, 2&2, 3&3, 4&4, 5&5, and 6&6. When a player rolls a double that player must "play" four times the numerical value on one of the dice. For example, if a player rolled a 3&3 double, the player should play four times three playing spaces. A player can play any token, provided it will not land on a Berd; because a Berd blocks the space that it occupies. The numerical value on one die cannot be split. Instead, such values must be played fully by one token. In this example with a 3&3 double, a player can: (1) play one token 3+3+3+3 (total is 4×3); (2) play one token 3+3+3 (three times) and play another token 3 (total is 3×3+3); (3) play one token 3+3 and play another token 3+3 (total is 2×3+2×3); (4) play one token 3+3 and play two different tokens 3 each (total is 2×3+3+3); or (5) play four different tokens 3 (total is 3+3+3+3). If a double is rolled, the rule may be expressed as $N=N_1+N_1+N_1+N_1=4N$ where $N_1=N_2$.

If a double is not rolled, a player moves his/her tokens either $N_1$, $N_2$, or N as previously described and as shown at 112 of FIG. 3A. If a double is not rolled, the rule may be expressed as $N=N_1+N_2$.

After rolling the dice and deciding how to move one's tokens, a player then moves his/her active token(s) or unprotected tower(s) accordingly, as denoted at 114. Specifically, as shown at 116, a player may decide to move a single token or a single unprotected tower a total number of spaces N equal to the sum of $N_1$ and $N_2$. Alternatively, as shown at 118, a player may move a token or tower $N_1$ spaces and another token or tower $N_2$ spaces. If double is rolled a player can move up to 4 active tokens or unprotected towers. There are many ways to play the double: (A) move one token/unprotected tower $4\times N_1$; (B) move one token/unprotected tower $3\times N_1$ and other token/unprotected tower $N_1$; (C) move one token/unprotected tower $2\times N_1$ and move other token/unprotected tower $2\times N_1$; (D) move one token/unprotected tower $2\times N_1$ and move two other tokens/unprotected towers $N_1$ each; (E) move 4 tokens/unprotected towers $N_1$ each. In order to move tokens from the Berd in case of non-double roll, a player has to split the Berd and move active token(s) or unprotected tower(s) $N_1$ and $N_2$.

Several rules exist for landing on playing spaces. Referring to 124, 150, and 152 in FIG. 3B, if a player lands on an unoccupied playing space, the player can land directly on that space and occupy the space. Referring to 128 and 132, if the playing space is occupied by another player's Berd, then the moving player can not land in nor occupy that space. Referring to 128 and 134, if the playing space is occupied by another player's unprotected token or tower, the moving player may land in that space and furthermore may capture (and thus de-activate) the other player's unprotected token or tower. The moving player captures another player's unprotected token or tower by stacking his/her token on top of the other player's token or tower. Referring to 144 and 154, if the playing space is occupied by a player's own token, then a Berd is created on that playing space. Referring to 146 and 154, if the playing space is occupied by a player's own unprotected tower, then a Berd is created in that playing space. Referring to 148 and 154, if the playing space is occupied by a player's own Berd, then the player will add a playing token on that Berd.

During the capturing process described at 134-138, a Berd may be created if there was/were inactive token(s) of a moving player in the unprotected tower. The inactive token(s) was/were captured (deactivated) in the tower at some previous step(s) by other player(s) and now the moving player by capturing the unprotected tower, releases his/her own token(s) and creates a Berd. As described at 138, the capturing player restacks the tower with his/her tokens on top. If a Berd is not created such as at 140, the tower is still unprotected but now it is owned by the player that stacked his/her token on the top.

After one of 138, 140, 152, or 154, the moving player's turn has ended and the next player's turn begins as shown at 142.

When a player returns to his/her home space and thus "finishes," he/she will collect one token from each active player. In returning to one's home space, it is not necessary to land exactly on the home space from which the player started. All that is required is that the player pass or land on his/her home space. As noted, after landing on or passing one's home space, a player collects tokens from other active players. Other players can decide which color token and from which playing space on the board (if they so choose) to give a token to the finished player. Other players can give any token in their possession, whether from the board or from already finished tokens. When finishing, a player can only receive tokens based on how many tokens of their own color finished.

The game is over when only one active player remains. At that time, the winner of the game is identified as follows. The winner is the player who collected and finished with the most tokens. Counting of tokens for each player includes both collected tokens and the player's respective tokens. Tokens left on the board are not counted. Sometimes, the determination of which player won can be made by each player stacking all of their collected tokens and comparing to see whose tower is taller.

The present subject matter includes variations in the method of playing the game and/or components or types of components of the game. For example, in one variant version of the game, certain playing spaces provide protection from capture of token(s) by another player. Thus, if player A landed in such a protected playing space, player A's token(s) in that space could not be captured by any other player. In another game variation, one or more tokens include particular numerical values or "weighting." The weighting values, for example 10, 20, 30, 40, 50, 60, . . . etc., may impart greater importance or value to the particular token(s) containing such values. The weighting values may be utilized to determine total points of collected tokens at the end of a game and may also be used to assess the game winner, i.e., the player having the highest number of "points" or the sum of weighting values associated with the collected tokens.

As noted, the present subject matter can be implemented in electronic form using one or more electronic devices. Nonlimiting examples of suitable electronic devices include hand-held electronic devices such as smart phones, tablet computers, laptop computers, and the like. The electronic devices can also include televisions, tabletop devices, and dedicated gaming devices.

On each of the possible electronic devices, a display is provided or otherwise used on which is viewed one or more image(s) of the component(s) of the game such as the playing board, token(s), and/or die or dice.

The electronic device may additionally include one or more controllers or input components for a player to use in interacting with the game such as a mouse, a trackpad, a controller, a keyboard, a virtual keyboard, and a touchscreen. It will be understood that the present subject matter is not limited to any of these aspects and includes nearly any component or provision used to play the game as described herein.

The present subject matter game includes a variety of unique features. For embodiments of the game using weighting values or "numbered" tokens, the winner of the game is a player who collected the greatest value or amount of tokens. A player can collect tokens by finishing his/her own tokens, by finishing captured or inactive tokens stacked beneath his/her active token(s), and/or by collecting tokens from each active player for every finished active token.

In many embodiments of the game, captured tokens are carried forward and when finished, those tokens are counted along with the tokens of the finishing player.

In many game embodiments, upon finishing, a player receives one token from each active player for every finished active token of the finishing player. This enables a player to win the game by finishing with relatively few of his/her own tokens.

In many game embodiments, upon capturing another player's tower that contains the capturing player's token, the capturing player can release his/her token and create a Berd.

As previously noted, the game is over when only one active player remains.

In most other race-fight games the winner is a player who finished all tokens the first. In the present invention game that is not true. A player can win the game even though the player finished last. In many instances the winner does not finish all his/her active tokens; some of them remain on the board but because with other finished tokens this player collected the most tokens, he/she is the winner. It is also possible to win this game by finishing only one token; for example if a player captured many opponent's tokens and finished them in that player's unprotected tower. In this case the player won because the player captured/collected so many tokens in one finished unprotected tower that exceeded the amount of tokens other players collected.

Many other benefits will no doubt become apparent from future application and development of this technology.

All patents, published applications, and articles noted herein are hereby incorporated by reference in their entirety.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:
1. A board game comprising:
a playing board defining a plurality of playing spaces arranged one after another in a continuous path and including a plurality of home playing spaces each separated from neighboring home playing spaces by an equal number of playing spaces, wherein the continuous path extends along a perimeter of the playing board and is square shaped;
a plurality of stackable tokens for movement along the playing spaces;
a pair of playing dice for indicating movement of the token(s) of a player upon rolling of the dice, each die having all its faces marked with different numerical values;
the tokens of each player being caused to move along the continuous path, the number of playing spaces corresponding to the numerical values on the pair of rolled dice;
wherein the tokens are moved by their respective players from a respective home playing space, along the con- tinuous path, and returning or passing the respective home playing space to thereby collect tokens from other players;

wherein the game is concluded when only one active player remains; and at the conclusion of the game, the winner of the game is determined by the player who collected and finished with the greatest number of tokens.

2. The board game of claim 1 wherein the plurality of home playing spaces constitute corners of the square shaped continuous path.

3. The board game of claim 2 wherein the square shaped continuous path defines four sides, each side constituting a number of playing spaces within a range of from 8 to 10.

4. The board game of claim 1, wherein the game further comprises:

an electronic device including a display, the playing board is in the form of an image on the display and the dice are in the form of an image on the display.

5. The board game of claim 4 wherein the electronic device is in the form of a hand-held electronic device.

6. A method of playing a board game comprising:

providing (i) a playing board defining a plurality of playing spaces arranged one after another in a continuous path and including a plurality of home playing spaces each separated from neighboring home playing spaces by an equal number of playing spaces, wherein the continuous path extends along a perimeter of the playing board and is square shaped, (ii) a plurality of stackable tokens for movement along the playing spaces, (iii) a pair of playing dice for indicating movement of the tokens of a player, each die having all its faces marked with different numerical values;

rolling the pair of playing dice to indicate movement of tokens of a respective player;

moving at least one token along the continuous path, the number of playing spaces corresponding to numerical values in the pair of rolled dice;

whereby upon a respective player reaching their home playing space, collecting tokens from other players;

whereby the game is concluded when only one active player remains; and at the conclusion of the game, the winner of the game is determined by the player who collected and finished with the greatest number of tokens.

7. The method of claim 6 wherein the moving includes moving one token a number of playing spaces equal to a total sum of the numerical values on the pair of rolled dice.

8. The method of claim 6 wherein the moving includes moving a first token a number of playing spaces equal to a numerical value on a first die of the pair of rolled die, and moving a second token a number of playing spaces equal to a numerical value on a second die of the pair of rolled die.

9. The method of claim 6 wherein the moving includes moving a plurality of tokens.

10. The method of claim 9 wherein the plurality of tokens includes a single token of the respective player performing the moving.

11. The method of claim 9 wherein the plurality of tokens includes two or more tokens of the respective player performing the moving.

12. The method of claim 6 wherein moving at least one token includes moving the at least one token to a playing space free of tokens of any other players.

13. The method of claim 6 wherein moving at least one token includes moving the at least one token to a playing space that includes at least one token of another player.

14. The method of claim 13 wherein moving includes stacking at least one token on another token or group of tokens in the playing space.

15. A board game comprising:

a playing board defining a plurality of playing spaces arranged one after another in a continuous path and including a plurality of home playing spaces each separated from neighboring home playing spaces by an equal number of playing spaces, wherein the continuous path extends along a perimeter of the playing board and is square shaped;

a plurality of vertically stackable tokens for movement along the playing spaces;

a pair of playing dice for indicating movement of the token(s) of a player upon rolling of the dice, each die having all its faces marked with different numerical values;

the tokens of each player being caused to move along the continuous path, the number of playing spaces corresponding to the numerical values on the pair of rolled dice;

wherein the tokens are moved by their respective players from a respective home playing space, along the continuous path, and returning or passing the respective home playing space to thereby collect tokens from other players;

wherein the game is concluded when only one active player remains; and at the conclusion of the game, the winner of the game is determined by the player who collected and finished with the greatest number of tokens;

wherein the plurality of home playing spaces constitute corners of the square shaped continuous path; and wherein the square shaped continuous path defines four sides, each side constituting a number of playing spaces within a range of from 8 to 10.

* * * * *